(12) United States Patent
Schaefer et al.

(10) Patent No.: US 10,315,588 B2
(45) Date of Patent: Jun. 11, 2019

(54) SECUREMENT OF INSULATION IN VEHICLE BODY STRUCTURES

(71) Applicant: GM Global Technology Operations LLC, Detroit, MI (US)

(72) Inventors: Thilo Schaefer, Rüsselsheim (DE); Werner Berhard, Rüsselsheim (DE); Peter Weingaertner, Rüsselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/697,932

(22) Filed: Sep. 7, 2017

(65) Prior Publication Data

US 2019/0071032 A1 Mar. 7, 2019

(51) Int. Cl.
*B62D 33/00* (2006.01)
*B60R 13/08* (2006.01)

(52) U.S. Cl.
CPC ...... *B60R 13/0815* (2013.01); *B60R 13/0846* (2013.01); *B60R 13/0884* (2013.01); *B60R 2013/0807* (2013.01)

(58) Field of Classification Search
CPC ... G06F 3/044; H01L 27/124; H01L 27/1288; G02F 1/136286; G02F 1/1368
USPC ...................................................... 296/39.3
See application file for complete search history.

(56) References Cited

U.S. PATENT DOCUMENTS

| | | | | |
|---|---|---|---|---|
| 4,288,490 A | * | 9/1981 | Alfter | B32B 27/00 428/314.8 |
| 4,801,169 A | * | 1/1989 | Queen | B60R 13/01 296/39.1 |
| 5,196,253 A | * | 3/1993 | Mueller | B32B 3/266 181/211 |
| 5,233,832 A | * | 8/1993 | Moore, III | F01N 13/102 181/240 |
| 5,590,524 A | * | 1/1997 | Moore, III | F01N 13/102 181/240 |
| 5,633,067 A | * | 5/1997 | Illbruck | B60R 13/0838 123/195 C |
| 5,979,962 A | * | 11/1999 | Valentin | B60R 13/01 296/37.1 |
| 6,102,465 A | * | 8/2000 | Nemoto | B60R 13/02 181/286 |
| 6,145,909 A | * | 11/2000 | Staley | B60J 7/0084 296/107.08 |
| 6,155,624 A | * | 12/2000 | Bienenstein, Jr. | B62D 25/161 280/847 |
| 6,197,403 B1 | * | 3/2001 | Brown | B60R 13/0815 296/39.1 |
| 6,227,606 B1 | * | 5/2001 | Schroeder | B62D 25/105 296/146.1 |

(Continued)

*Primary Examiner* — Kiran B Patel

(57) ABSTRACT

A semi-rigid panel of foam insulation is secured transversely between the front fenders and certain body structures of a motor vehicle at several locations. Specifically, the insulation is located and secured to the fender by a retainer or clip having a channel that receives the insulation panel; the panel includes projections or lugs that are complementary to and seat within with frame or body member openings, ribs or other features; is secured within an integrated bracket or holder in the upper plenum having a slot or channel having a width equal to the thickness of the insulation; and includes a hook or lip that is received within an air inlet of the heating and air conditioning system of the vehicle.

14 Claims, 2 Drawing Sheets

(56) References Cited

U.S. PATENT DOCUMENTS

| | | | | |
|---|---|---|---|---|
| 6,290,278 B1* | 9/2001 | Loveland | B60R 5/04 | 296/37.3 |
| 6,302,466 B1* | 10/2001 | Zwick | B60R 13/08 | 296/39.3 |
| 6,767,049 B1* | 7/2004 | Morrison | B60J 5/0418 | 296/1.08 |
| 6,997,505 B2* | 2/2006 | Dry | B60R 13/0243 | 296/146.7 |
| 7,017,969 B1* | 3/2006 | Kirkham | B60R 13/011 | 296/39.1 |
| 7,055,887 B2* | 6/2006 | Williams, II | B60J 5/0418 | 296/146.1 |
| 7,070,848 B2* | 7/2006 | Campbell | B60R 13/083 | 181/284 |
| 7,410,204 B2* | 8/2008 | Koa | B60J 5/0416 | 296/152 |
| 7,419,188 B2* | 9/2008 | Nicolai | B32B 27/12 | 280/847 |
| 7,448,468 B2* | 11/2008 | Czerny | B60R 13/0861 | 181/210 |
| 7,753,435 B2* | 7/2010 | Hanna | B60J 5/0418 | 296/146.5 |
| 7,810,828 B2* | 10/2010 | Sugiyama | B62D 25/163 | 280/152.05 |
| 7,946,646 B2* | 5/2011 | Kim | B62D 25/16 | 296/198 |
| 8,146,987 B2* | 4/2012 | Uchino | B62D 25/161 | 296/198 |
| 8,556,297 B2* | 10/2013 | Uehara | B32B 5/08 | 280/851 |
| 9,428,121 B2* | 8/2016 | Vaughn, Jr. | B60R 13/0861 | |
| 10,077,011 B1* | 9/2018 | Gun Yuksel | B60R 13/0815 | |
| 10,131,383 B2* | 11/2018 | Job | B62D 25/161 | |
| 2003/0168888 A1* | 9/2003 | Decker | B60R 13/0838 | 296/198 |
| 2004/0080185 A1* | 4/2004 | Loddo | B62D 25/168 | 296/198 |
| 2005/0133302 A1* | 6/2005 | Pfaffelhuber | B60R 13/08 | 181/293 |
| 2005/0140180 A1* | 6/2005 | Hesch | B60J 5/0452 | 296/208 |
| 2006/0124387 A1* | 6/2006 | Berbner | B22F 3/002 | 181/290 |
| 2006/0214474 A1* | 9/2006 | Omiya | B60R 13/0861 | 296/198 |
| 2008/0079281 A1* | 4/2008 | Aoyama | B60R 13/08 | 296/39.3 |
| 2008/0231082 A1* | 9/2008 | Mathew | B62D 25/161 | 296/198 |
| 2010/0078927 A1* | 4/2010 | Takeuchi | B26F 1/24 | 280/851 |
| 2013/0134735 A1* | 5/2013 | Shives | B60R 13/0815 | 296/39.3 |
| 2014/0028045 A1* | 1/2014 | Schaefer | B60R 13/08 | 296/39.3 |
| 2014/0159414 A1* | 6/2014 | Vaughn, Jr. | B60R 13/0861 | 296/39.3 |
| 2014/0175825 A1* | 6/2014 | Shimanaka | B62D 25/16 | 296/39.3 |
| 2015/0115643 A1* | 4/2015 | Stepanski | B60R 13/0243 | 296/39.3 |
| 2016/0236603 A1* | 8/2016 | Stroud | B60N 3/046 | |
| 2016/0311382 A1* | 10/2016 | Murasawa | B60N 3/042 | |
| 2017/0008462 A1* | 1/2017 | Taniguchi | B60R 13/0861 | |
| 2018/0009398 A1* | 1/2018 | Onishi | B32B 3/28 | |
| 2018/0208132 A1* | 7/2018 | Schaefer | B60R 13/083 | |

* cited by examiner

SECUREMENT OF INSULATION IN VEHICLE BODY STRUCTURES

FIELD

The present disclosure relates to fixing or securing a panel of insulation at multiple points within a motor vehicle body and more particularly the securement of a panel of semi-rigid foam insulation between a motor vehicle body and fenders at four individual locations.

BACKGROUND

The statements in this section merely provide background information related to the present disclosure and may or may not constitute prior art.

The reduction of noise, vibration and harshness (NVH) in passenger cars, light trucks and similar motor vehicles has always been a subject of concern and study. Recently, increased emphasis has been placed on the reduction of road noise, a major portion of which is generated by the rotating contact between the vehicle tires and the roadway. While attention has been directed to the tires and the tire/road interface, significant attention has also been directed to isolating the vehicle cabin from such exterior sounds with various materials and techniques.

In this regard, it has been found that significant noise pathways exist between the wheel wells, where road and tire noise is concentrated and the adjacent body structure such as the front foot wells.

SUMMARY

The present disclosure is directed to improving motor vehicle cabin isolation by reducing the amount of exterior noise, especially noise from the rotating tires and wheels, the tire/roadway interface and the suspension from entering the cabin, thereby providing a quieter cabin and improving customer satisfaction. The disclosure comprehends the fixing or securement of a semi-rigid panel of foam insulation transversely between the front fenders and certain vehicle body structures at several locations.

Specifically, the insulation is located and secured to the fender by a metal retainer or clip having a channel that receives the insulating panel; includes projections or lugs on the panel that are complementary to and seat within or mate with body openings, ribs or other features; is secured within an integrated bracket of holder in the upper plenum having a slot or channel having a width equal to the thickness of the insulation; and includes a hook or overhanging lip that is received within an air inlet for the heating and air conditioning system of the vehicle.

Thus it is an aspect of the present disclosure to provide a secure mounting arrangement for an insulation panel in a motor vehicle.

It is a further aspect of the present disclosure to provide a secure mounting scheme for a semi-rigid insulation panel in a motor vehicle.

It is a still further aspect of the present disclosure to provide a plurality of mounting locations for a panel of semi-rigid insulation in a motor vehicle.

It is a still further aspect of the present disclosure to provide a plurality of secure mounting locations for a panel of insulation disposed adjacent a fender of a motor vehicle.

It is a still further aspect of the present disclosure to provide four mounting locations for a semi-rigid panel of insulation disposed adjacent a fender of a motor vehicle.

It is a still further aspect of the present disclosure to provide four mounting locations for a semi-rigid panel of foam insulation disposed between a fender and the body of a motor vehicle.

It is a still further aspect of the present disclosure to provide a plurality of mechanical mounting locations for a panel of foam insulation disposed adjacent a fender of a motor vehicle.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
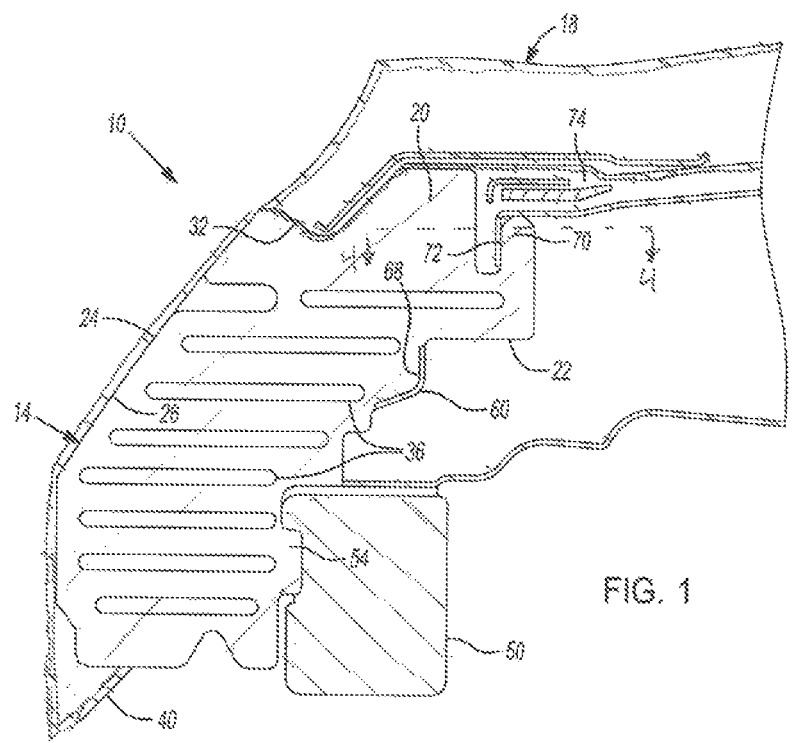
FIG. 1 is transverse, elevational, sectional view of a portion of a motor vehicle behind a front wheel, showing a portion of a fender, a hood and a panel of foam insulation secured according to the present disclosure.

With reference to FIG. 1, a portion of a passenger car, light truck or similar motor vehicle is illustrated and generally designated by the reference number 10. The view in FIG.1 is from behind a left front wheel (not illustrated) looking forward and the illustrated portion of the vehicle 10 includes a front fender 14 and a hood 18.

It should be understood that the present disclosure is not limited to the left side of the vehicle 10 but applies with equal accuracy and relevance to the right side of the vehicle 10. Inasmuch as the features described herein are essentially symmetrical with regard to the left and right sides of the vehicle 10, only the left side of the vehicle 10 and the various mounting features for a panel of insulation 20 will be described, it being understood that the insulation panel 20 on the right side of the vehicle 10 and its securement features are a mirror image of that illustrated and described.

The panel of insulation 20 is semi-rigid foam and is disposed behind the front wheel (not shown) and includes an irregular outer edge, profile or outline 22 which generally conforms to vehicle surfaces and components and is adapted for securement to the vehicle 10 at a plurality of locations by various retainers and body features. The panel of insulation 20 is preformed or precast and includes a specifically contoured surface 24 in substantially intimate contact with a portion of the inner surface 26 of the front fender 14 and proximate a portion of the inner surface 32 of the hood 18. As utilized herein, the term "semi-rigid" means that the panel of foam insulation 20 has sufficient strength and stiffness to maintain its shape, structural integrity and reasonable contact with the fender 14 notwithstanding exposure to typical ambient conditions experienced by motor vehicles such as wide temperature variations, water, snow, ice, dirt and road debris while also being sufficiently flexible to facilitate installation in the structural vehicle components and features described hereinafter. The panel of insulation 20 preferably includes parallel corrugations or convolutions 36, i.e., alternating parallel grooves or channels and projections or ribs, which provide additional strength and stiffness without added material and weight.

Figure 2:
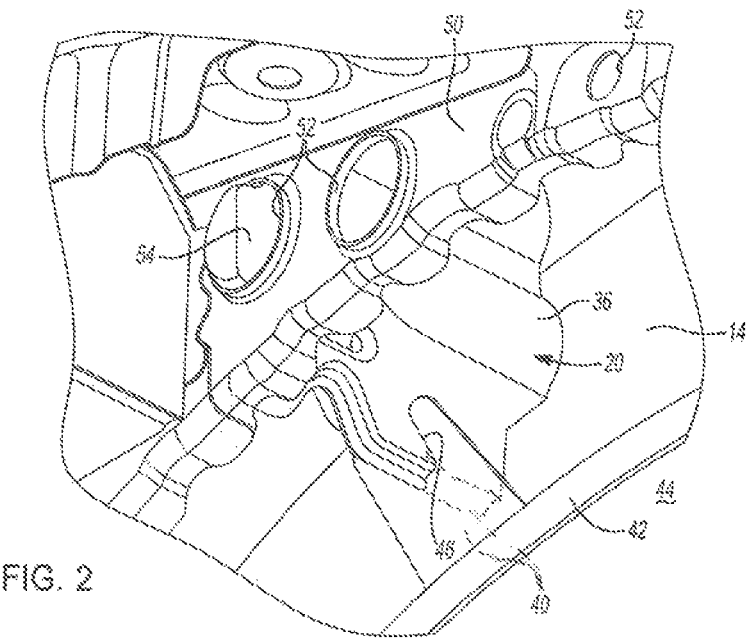
FIG. 2 is an enlarged, fragmentary perspective view of a portion of the panel of insulation secured by both a fender mounted retainer and an opening in the vehicle body structure according to the present disclosure.

Referring now to FIGS. 1 and 2, the panel of foam insulation 20 is retained in position against the fender 14 by an obliquely oriented, preferably metal, retainer 40 that extends upwardly and inwardly from a lip 42 of the fender 14 adjacent the wheel opening 44. The retainer 40 includes a deep channel or notch 46 having a width substantially equal to the thickness of the panel of insulation 20 and thus receives and positions it. The retainer 40 is flexible and may be bent or adjusted to provide vertical positioning and support for the panel of insulation 20.

Proximate the fender 14 and extending longitudinally along the vehicle 10 is a frame 50 which typically includes a plurality of variously located, existing features or upsets such as through apertures, or holes or ribs, beads or other body features 52. Such apertures 52, are utilized, either singly or in combination, as mounting features for the insulation panel 20 which includes complementarily sized and located lugs or projections 54 (one of which is illustrated in FIG. 2) which provides secure friction fit mounting for the insulation panel 20 in the frame 50.

Figure 3:
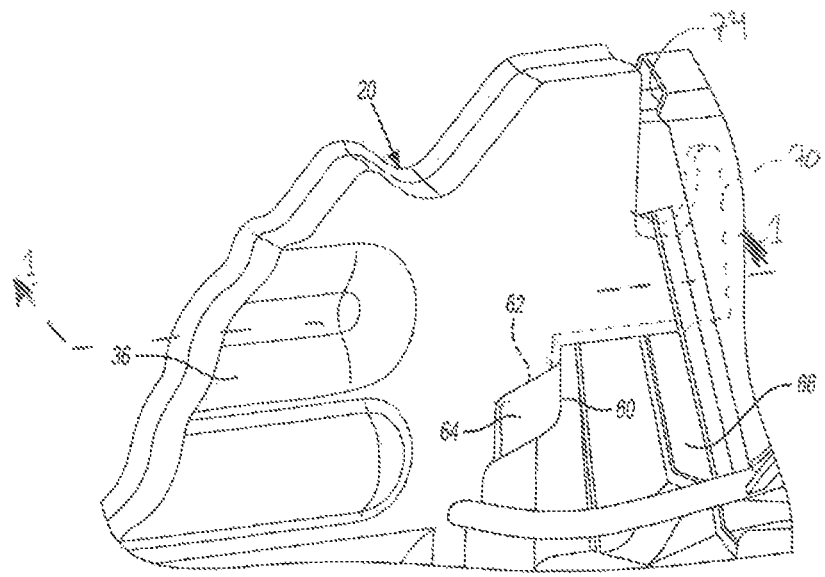
FIG. 3 is an enlarged, fragmentary perspective view of portion of the panel of insulation secured in a channel of a bracket which is an extension of the dash according to the present disclosure.

Referring now to FIGS. 1 and 3, an additional mounting and positioning feature comprehends a curved bracket 60 including a channel 62 defined by sidewalls 64 having a width equal to the thickness of the insulation panel 20 which is secured to or formed as an integral component of an upper plenum or dash extension 66. The curved bracket 60 frictionally engages a complementarily curved portion 68 of the irregular outer edge 22 of the panel of insulation 20 and assists maintenance of the position of the panel of insulation 20 against the inner surface 26 of the fender 14 as well as proximate the inner surface 32 of the hood 18.

Figure 4:
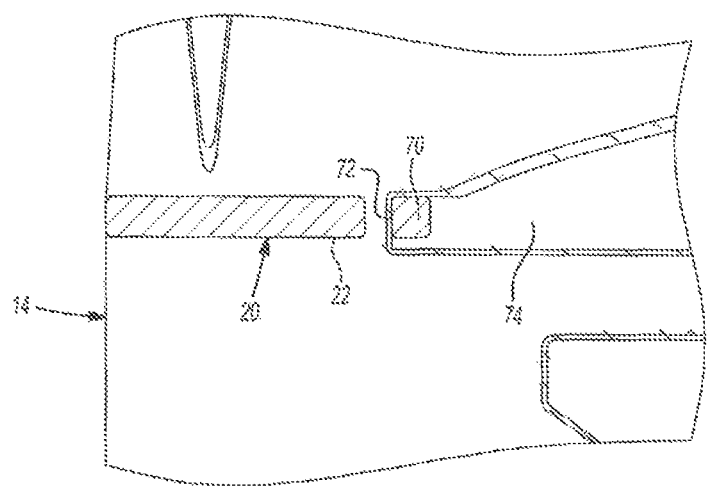
FIG. 4 is an enlarged, fragmentary plan view of the panel of insulation secured to and retained in an air inlet duct by a hook according to the present disclosure.

Referring now to FIGS. 1 and 4, a fourth mounting and positioning feature comprehends cooperation between an upwardly directed hook 70 formed as a portion of the irregular outer edge 22 of the panel of insulation 20. The hook 70 cooperates with a flange 72 on an air inlet 74 of the heating and air condition system (not illustrated) to locate, secure and retain the panel of insulation 20 in its desired position, both in the channel 62 of the curved bracket 60 and in the aperture 52 in the body member 50.

Installation of the semi-rigid panel of insulation 20 may be accomplished either before or after the fender 14 is mounted on the vehicle 10. When installed before the fender 14 is mounted on the vehicle 10, the panel of insulation 20 is raised to a position above its final installed position, and the hook 70 is inserted into the air inlet 74 so that it engages the flange 72. The panel of insulation 20 is then lowered so that the complimentarily curved portion 68 of the irregular outer edge 22 seats in the channel 62 of the bracket 60 and the lug or projection 54 seats within the aperture 52 of the frame 50. When the fender 14 is installed on the vehicle 10, the panel of insulation 20 is positioned within the notch 46 of the retainer 40. When the panel of insulation 20 is installed after the fender 14 has been mounted to the vehicle 10, a similar series of steps is undertaken: the hook 70 is engaged with the flange 72 in the air inlet 74, the complimentary curved portion 68 is seated in the channel 62 of the bracket 60, the lug or projection 54 is seated in the aperture 52 and the retainer 40 is temporarily repositioned so that the panel of insulation 20 can be seated in the notch 46 thereof.

Accordingly, it will be appreciated that the semi-rigid panel of insulation 20 can be readily installed in substantially existing features or components of the vehicle 10. This provides cost savings over other insulation mounting schemes. Furthermore, mounting the panel of insulation 20 in this manner minimizes relative movement between the panel of insulation 20 and body panels and components, eliminating paint abrasion and corrosion. The permanent, stable position of the panel of insulation 20 as well as good acoustic, i.e., sound deadening, performance resulting from the seal between the panel of insulation 20 and the inner surface 26 of the front fender 14 is assured by the mounting configuration disclosed herein.

The above disclosure is merely exemplary in nature and variations that do not depart from the gist of the disclosure are intended to be, and should be considered to be, within the scope of the disclosure. Moreover, such variations are not to be regarded as a departure from the spirit and scope of the disclosure.

What is claimed is:

1. A mounting configuration in a motor vehicle, the mounting configuration comprising:
   a fender;
   a panel of insulation having a contoured surface conforming to an inner surface of the fender, a projection and a hook;
   a retainer extending upwardly and inwardly from a lip of the fender, the retainer having a notch, wherein the panel of insulation is disposed within the notch;
   a frame having an aperture, wherein the projection of the panel of insulation is disposed through the aperture;
   an air inlet having a flange, wherein the hook of the panel of insulation contacts the flange to locate and secure the panel of insulation; and
   a bracket disposed between the frame and the air inlet, wherein the panel of insulation frictionally engages the bracket.

2. The mounting configuration of claim 1 wherein the panel of insulation is semi-rigid.

3. The mounting configuration of claim 1 wherein the panel of insulation includes corrugations.

4. The mounting configuration of claim 1 wherein the frame extends longitudinally along the motor vehicle.

5. The mounting configuration of claim 1 wherein the panel of insulation is disposed transversely in the motor vehicle.

6. The mounting configuration of claim 1 wherein the panel of insulation is preformed.

7. The mounting configuration of claim 1 wherein the retainer is disposed adjacent a wheel opening in the fender.

8. The mounting configuration of claim 1 wherein the notch has a width substantially equal to a thickness of the panel of insulation.

9. The mounting configuration of claim 1 wherein the retainer is flexible and may be bent or adjusted to provide vertical positioning and support for the panel of insulation.

10. The mounting configuration of claim 1 wherein the bracket is curved.

11. The mounting configuration of claim 1 wherein the bracket includes a channel.

12. The mounting configuration of claim 1 wherein the channel is defined by sidewalls having a width equal to a thickness of the panel of insulation which is secured to a dash extension.

13. The mounting configuration of claim 1 wherein the bracket frictionally engages a complementarily curved portion of the edge of the panel of insulation and assists a position of the panel of insulation against the inner surface of the fender as well as proximate an inner surface of a hood.

14. The mounting configuration of claim 1 wherein the hook is formed as a portion of an edge of the panel of insulation.

* * * * *